United States Patent
Leonard et al.

(10) Patent No.: US 7,353,090 B2
(45) Date of Patent: Apr. 1, 2008

(54) SYSTEM, BUS MONITOR ASSEMBLY AND METHOD OF MONITORING AT LEAST ONE DATA BUS OF AN AIRCRAFT

(75) Inventors: James V. Leonard, St. Charles, MO (US); Robert K. Menzel, Lake Saint Louis, MO (US); Richard E. Meyer, Florissant, MO (US)

(73) Assignee: The Boeing Company, Chicago, IL (US)

( * ) Notice: Subject to any disclaimer, the term of this patent is extended or adjusted under 35 U.S.C. 154(b) by 570 days.

(21) Appl. No.: 10/957,824

(22) Filed: Oct. 4, 2004

(65) Prior Publication Data
US 2008/0046136 A1   Feb. 21, 2008

(51) Int. Cl.
*G01R 1/00* (2006.01)
*G06F 17/00* (2006.01)

(52) U.S. Cl. ................ 701/3; 701/1; 701/4; 324/158.1; 244/3.1; 340/945

(58) Field of Classification Search .................... 701/3, 701/4, 1; 324/158.1, 73.1; 340/945; 244/3.1
See application file for complete search history.

(56) References Cited

U.S. PATENT DOCUMENTS

| | | | | |
|---|---|---|---|---|
| 5,377,109 A | * | 12/1994 | Baker et al. | 701/14 |
| 5,541,839 A | * | 7/1996 | Mitzkus et al. | 244/3.16 |
| 5,548,510 A | * | 8/1996 | Ebert et al. | 701/200 |
| 5,992,290 A | * | 11/1999 | Quebedeaux et al. | 89/1.56 |
| 6,122,569 A | | 9/2000 | Ebert et al. | |
| 6,615,115 B1 | | 9/2003 | Ebert et al. | |
| 7,137,599 B1 | * | 11/2006 | Sitzmann et al. | 244/137.4 |
| 2004/0015273 A1 | | 1/2004 | Leonard et al. | |

\* cited by examiner

*Primary Examiner*—Tan Q. Nguyen
(74) *Attorney, Agent, or Firm*—Alston & Bird LLP (57) ABSTRACT

A system is provided for monitoring at least one data bus of an aircraft. The system includes an aircraft adapted to control the operation of stores of a second predetermined type (e.g., Harpoon Block I missiles). However, the aircraft is also capable of carrying a store of a first predetermined type (e.g., Harpoon Block II missiles), and capable of communicating with the store across a communication bus (e.g., MK-82 Digital Data Bus). The system also includes a bus monitor assembly capable of capturing data communications transferred across the communication bus between the aircraft and the store, the data communications being captured from the communication bus. The bus monitor assembly is also capable of preparing the data communications, and monitoring the communication bus across which the data communications are transferred, the communication bus being monitored based upon the prepared data communications.

21 Claims, 8 Drawing Sheets

SYSTEM, BUS MONITOR ASSEMBLY AND METHOD OF MONITORING AT LEAST ONE DATA BUS OF AN AIRCRAFT

FIELD OF THE INVENTION

The present invention relates generally to systems and methods of monitoring data buses of an aircraft and, more particularly, to systems, bus monitors and methods of monitoring store interface buses of an aircraft.

BACKGROUND OF THE INVENTION

Modern aircraft, such as the F-15 aircraft manufactured by the assignee of the present invention, and the P-3, the S-3 and the F-16 aircraft manufactured by Lockheed Aeronautical Systems Company, are adapted to carry stores. These stores can, for example, include missiles, such as the Stand-off Land Attack Missile (SLAM), the Harpoon Block I missile, and the Harpoon Block II missile. A missile is generally mounted to the wing of a host aircraft, typically via disconnectable pylons, such that the aircraft can carry the missile to the vicinity of the target destination prior to its deployment.

Typically, aircraft include provisions to carry and launch stores of a predetermined type. For example, aircraft such as the P-3 aircraft typically have provisions to carry and launch Harpoon Block I missiles. The aircraft provisions can include aircraft wiring and a weapon control subsystem, such as a Harpoon Aircraft Command and Launch Control System (HACLCS). In this regard, the weapon control subsystem can provide pre-launch power and control signals to develop and load mission and target parameters into the store, and then provide launch functions to the store and thereafter release the store. Generally, the store is attached to the aircraft at a weapon store pylon that provides the mechanical mounting and release mechanisms and the electrical connection for the power, control and communication link with the weapon control subsystem within the aircraft. In turn, a short umbilical cable normally provides the electrical connection between the store and the aircraft. In this regard, the umbilical cable is typically mechanically restrained and electrically connected to the aircraft pylon on one end, and electrically connected through a releasable connector at a store umbilical connector at the other end.

Generally, Harpoon Block II missiles include the same umbilical interface connection to the aircraft pylon as Harpoon Block I missiles. Harpoon Block II missiles also use the same electrical power and control specification and connector pin assignments as Harpoon Block I missiles. In contrast to Harpoon Block I missiles, however, Harpoon Block II missiles have a more sophisticated flight control system that allows precision GPS-aided navigation to targets that cannot be assigned to Harpoon Block I missiles. The GPS-aided navigation system allows the Harpoon Block II missile to fly a more complex mission engagement path using parameters that must be preplanned and stored in the weapon's volatile memory before launch. Due to the increased number of parameters that can be loaded into Harpoon Block II missiles, conventional bus test support equipment designed for Harpoon Block I missiles cannot retain the increased amount of data, and cannot fault isolate errors in the launch equipment and missile communications.

SUMMARY OF THE INVENTION

In light of the foregoing background, the present invention provides a system, bus monitor assembly and method of monitoring at least one data bus of an aircraft. According to embodiments of the present invention, the bus monitor assembly can monitor a communication bus of an aircraft, such as the MK-82 Digital Data bus, that allows bi-directional communication between the aircraft and a store. As explained below, the aircraft is typically adapted to control the operation of stores of a second predetermined type (e.g., Harpoon Block I missiles), whereas the store communicating with the aircraft comprises a store of a first predetermined type (e.g., Harpoon Block II missile). Thus, the bus monitor assembly is advantageously capable of supporting the expanded data of Harpoon Block II missiles, while also supporting the data communications to/from Harpoon Block I missiles. Also, in addition to capturing traffic on the communication bus and determining if the communications are correct, the bus monitor assembly is capable of providing menu-driven displays. Such displays, then, can facilitate a user directing the bus monitor assembly to display the captured communications, such as in word blocks by name, scaled values, and/or correctness and/or reasonableness.

According to one aspect of the present invention a system is provided for monitoring at least one data bus of an aircraft. The system includes an aircraft adapted to control the operation of stores of a second predetermined type (e.g., Harpoon Block I missiles) but also capable of carrying a store of a first predetermined type (e.g., Harpoon Block II missiles). In this regard, the aircraft is capable of communicating with stores of the first predetermined type and/or stores of the second predetermined type across a communication bus (e.g., MK-82 Digital Data Bus). The system also includes a bus monitor assembly capable of capturing data communications transferred across the communication bus between the aircraft and a store of either the first predetermined type or the second predetermined type.

The bus monitor assembly is also capable of preparing the data communications, and monitoring the communication bus across which the data communications are transferred, the communication bus being monitored based upon the prepared data communications. For example, the bus monitor assembly can be capable of validating a protocol of the prepared data communications to thereby monitor the communication bus. More particularly, the bus monitor assembly can be capable of validating a message sequence, a data word parity and/or a message checksum. In addition to, or in lieu of, validating the protocol, the bus monitor assembly can be capable of storing the prepared data communications, and presenting the stored data communications to a user, to thereby monitor the communication bus.

The bus monitor assembly can more particularly include a computer system and an event detector. In such instances, the computer system can be capable of capturing the data communications, preparing the data communications, and monitoring the communication bus across which the data communications are transferred. In addition, the computer system can be capable of providing at least one external output in response to capturing the data communications. The event detector, in turn, can be capable of capturing at least one external output of the aircraft, and capable of capturing the external output(s) of the computer system. The event detector can then be capable of determining, or facilitating determination of, a time latency between capturing the external output(s) of the aircraft and the external output(s) of the computer system.

A bus monitor assembly and method of monitoring at least one data bus of an aircraft are also provided.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
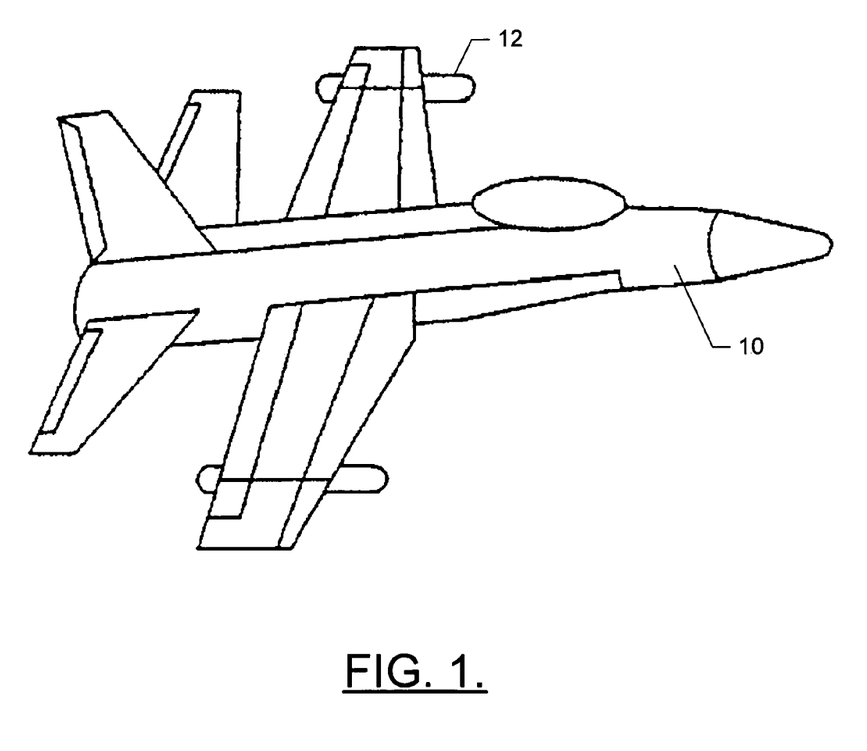
FIG. 1 is a perspective view showing an aircraft carrying a missile store.

Referring now to FIG. 1, an aircraft 10 and one type of associated store is illustrated. The aircraft can comprise any number of aircraft adapted to control the operation of stores of a second predetermined type, such as Harpoon Block I or SLAM missiles. For example, the aircraft can comprise a P-3 maritime patrol aircraft manufactured by Lockheed Aeronautical Systems Company.

A missile 12 represents one type of associated store that may be carried on the aircraft. The aircraft can carry missiles of both first and second predetermined types, although the aircraft is generally adapted to control the operation of stores of the second predetermined type, such as Harpoon Block I missiles or SLAM missiles. A missile of a first predetermined type can comprise a Harpoon Block II missile, as such is known. The aircraft 10 and missile are generally adapted to process signals in accordance with a communications format, such as the signal format known as Harpoon MK-82 Digital Data Bus. As is known to those skilled in the art, the MK-82 Digital Data Bus provides four signals, including three input signals consisting of a clock strobe, a missile data out signal consisting of 16 bits plus a parity bit, a data enable signal, and one output signal (a data in signal). As used herein, stores of the second predetermined type may be described as Harpoon Block I missiles, and stores of the first predetermined type may be described as Harpoon Block II missiles. It will be understood, however, that the type of stores can vary without departing from the spirit and scope of the present invention. For example, stores of the second predetermined type can comprise SLAM missiles.

Figure 2A:
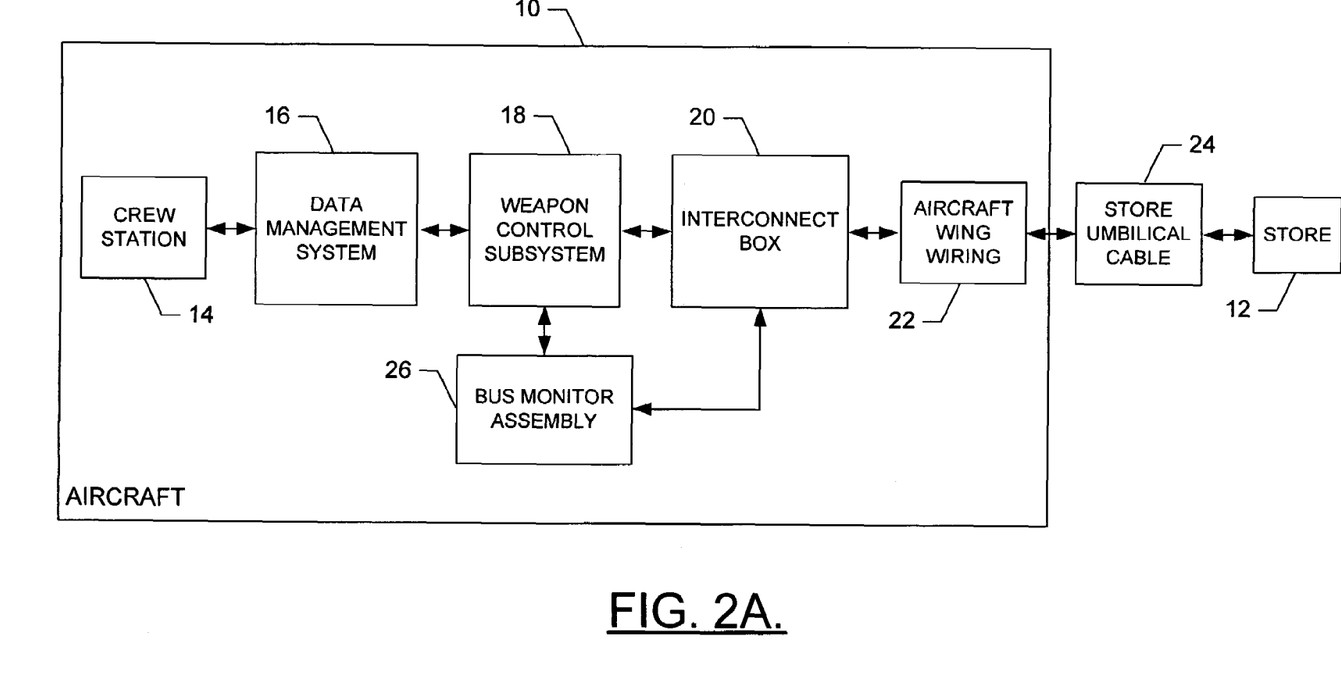
FIG. 2A is a block diagram illustrating a system for monitoring at least one data bus of an aircraft according to one embodiment of the present invention.

As illustrated in FIG. 2A, the aircraft 10 includes a crew station 14 that generally contains a plurality of controls and display devices, such as head-down and head-up video displays, a control stick, and a throttle, which are used by an aircrew to fly the aircraft and to interact with, and deploy, the associated stores. In this regard, the crewstation controls and display devices communicate with a data management system 16, which controls the overall operation of many of the aircraft subsystems, such as during the launch sequence of the store 12. The data management system communicates with other avionics equipment, such as a weapon control subsystem 18. The weapon control subsystem comprises, for example, a Harpoon Aircraft Command and Launch Control System (HACLCS), which is typically used in conjunction with the deployment of Harpoon Block I missiles. The weapon control subsystem provides the missiles with power, typically three-phase AC power and 28 V DC power. In this regard, missiles such as Harpoon Block I missiles typically include a power converter for receiving the three-phase power from the weapon control subsystem. Also, the weapon control subsystem typically provides commands to control and propulsion systems of the missiles to trigger deployment of the missile, and the weapon control subsystem typically receives status from sensors and the control systems to thereby indicate a status of the missiles.

The weapon control subsystem 18 includes a control panel that allows an operator to choose a mode of operation of the aircraft 10 in controlling the operation of the store 12. Also, the control panel of the weapon control subsystem allows the operator to enter a target range and bearing, a seeker search area size, and the aircraft speed, altitude and attitude, as will be appreciated by those skilled in the art. In addition, the control panel allows the operator to "Select" (i.e., apply three-phase and DC power to selected missile) and to "Release" (i.e., initiate internal store batteries and launch an active store from the aircraft) the desired missile. Typically, the weapon control subsystem transmits commands to the store that allow the store to receive and use the applied power when "Select" is initiated. Also, the commands cause the store to activate internal systems to a launch condition when the "Release," sometimes referred to as an Intent-to-Launch (ITL), is initiated. The store can transmit status discrete signals to the weapon control subsystem to indicate the state of the missile and to "Enable" the weapon control subsystem to open hooks on the aircraft that release the store from the pylon. In this regard, with only the power and the ITL command applied to the store and the enable status returned to the aircraft, the aircraft can launch the store.

Figure 2B:
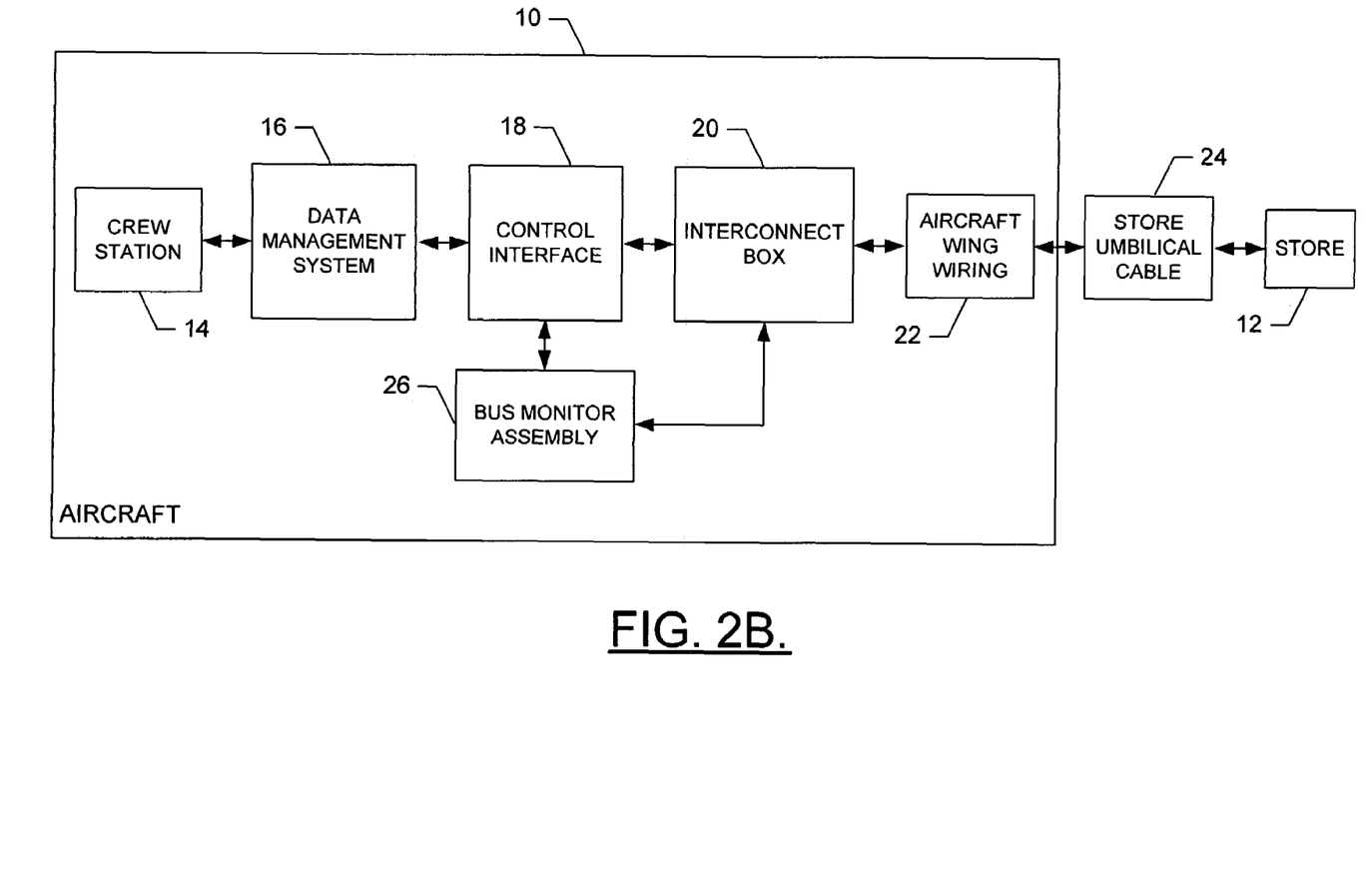
FIG. 2B is a block diagram illustrating a system for monitoring at least one data bus of an aircraft according to another embodiment of the present invention.

At this point it should be noted that some aircraft 10, such as the F-15 and USAF F-16 aircraft, while capable of launching a store 12 such as the Harpoon Block II missile, do not include the weapon control subsystem 18 required to provide power to the store and transmit and receive commands and status discrete signals, respectively, to and from the store since such aircraft were designed to launch a second predetermined type of store (e.g., Harpoon Block I missile). In such an instance, the aircraft can include a control interface 19, as shown in FIG. 2B. The control interface can comprise any of a number of different devices capable of performing the functions of the weapon control subsystem as described herein. In this regard, the control interface can be capable of launching the store provided the control interface is capable of providing power and the ITL command to the store. According to one embodiment, the control interface comprises a Harpoon Universal Launch Adapter Unit (HULAU), as such is known to those skilled in the art.

The aircraft 10 also includes an interconnect box 20 capable of mating the weapon control subsystem 18 (or control interface 19) to aircraft wing wiring 22. The aircraft wing wiring, in turn, is routed to wing pylons through an umbilical cable 24 that provides the aircraft power and control signals to the store 12, and the status signals from the store to the weapon control subsystem. The wiring also provides a communication bus 25 (see FIG. 3), such as a MK-82 Digital Data bus, that allows bi-directional communication between the weapon control subsystem and a processor (e.g., GNU) onboard the store. Typically, the aircraft wing wiring for the MK-82 Digital Data bus is used to load stores such as Harpoon Block I missiles with range, bearing altitude, speed, attitude and search parameters prior to launch of the store, as such are known to those skilled in the art.

As is also known by those skilled in the art, Harpoon Block I missiles can be launched in any of a number of modes and, thus, the aircraft 10 can be configured in any of such modes in controlling the operation of the store 12. In this regard, Harpoon Block I missiles can be configured for operation in one of three modes, including the Range and Bearing Launch (RBL), the Bearing Only Launch (BOL), and the Line Of Sight Launch (LOS). In RBL mode, Harpoon Block I missiles are given the range and bearing of the target and missile attack and search pattern option (small, medium or large), as well as the aircraft altitude, attitude and true air speed prior to launch. In operation in RBL mode, then, Harpoon Block I missiles typically fly the commanded bearing to a distance equal to the commanded range and then perform a commanded seeker search, and perform the commanded attack.

In BOL mode, the range to the target is unknown and not given to the Harpoon Block I missile before launch. In this regard, in BOL mode the missile is given the bearing of the target as well as the aircraft altitude, attitude and true air speed and the missile attack and BOL search pattern. In operation in BOL mode, then, Harpoon Block I missiles generally fly the commanded bearing and altitude while performing the commanded search for the target. And when the radar seeker detects a target, the missile performs the commanded attack.

In LOS mode, no data is loaded into the Harpoon Block I missile prior to launch and the communications bus is in an inactive state. More particularly, in LOS mode, Harpoon Block I missiles are not given target range and bearing or search and attack commands prior to launch. Also, in the LOS mode Harpoon Block I missiles must determine the launch parameters in-flight as the aircraft altitude, attitude and speed are not loaded into the store before launch. In this regard, in operation in LOS mode, Harpoon Block I missiles will typically continue to fly the bearing and attitude it had at the time of launch and will search and attack the first target encountered using default settings.

Figure 3:
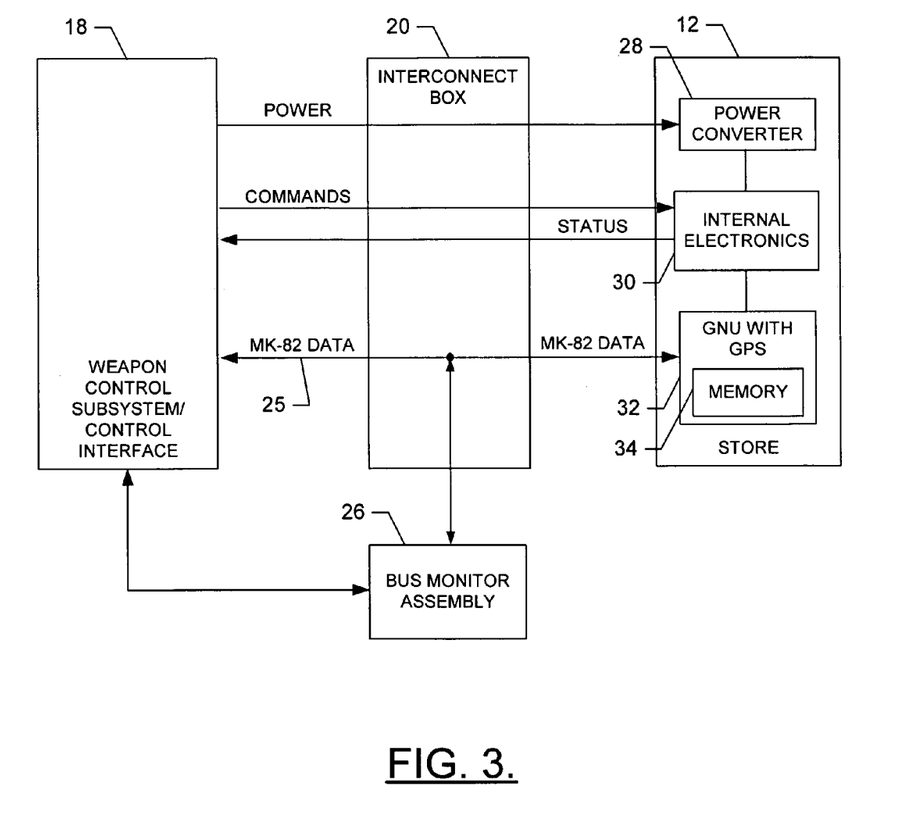
FIG. 3 is a block diagram illustrating the system of FIG. 2A highlighting the interconnection of data buses of an aircraft to a bus-monitor assembly according to one embodiment of the present invention.

Also, as is also known by those skilled in the art, and as shown in FIG. 3, stores 12 such as Harpoon Block II missiles, have the same interface, wire for wire, as the Harpoon Block I missiles described above and can function in all the same modes as Harpoon Block I missiles against targets at sea. Thus, like Harpoon Block I missiles, stores such as Harpoon Block II missiles typically include a power converter 28 for receiving three-phase power from the weapon control subsystem. Also, Harpoon Block II missiles also typically include internal electronics 30 such as sensors, control and propulsion systems that control operation of the missile and, thus, receive commands from the weapon control subsystem and provide status discretes to the weapon control subsystem. Unlike Harpoon Block I missiles, however, Harpoon Block II missiles include a global positioning system (GPS) receiver system referred to as a Guidance and Navigation Unit (GNU) 32 that provides precision strike capability to attack fixed land targets with known locations. Attacking fixed land targets requires a route from the launch point to the target that avoids obstacles, such as certain threat installations, terrain obstacles and populated areas. In this regard, the GNU typically includes an internal memory 34 capable of storing a route in the form of an engagement plan including engagement plan parameters.

Route planning for a Harpoon Block II missile, sometimes referred to as engagement planning, requires the use of a computer, such as a personal computer operating engagement planning application software having Harpoon Block II performance algorithms, terrain maps of the target and vicinity and a GPS Almanac. In operation, a Harpoon Block II missile can execute five major turns, or "waypoints," from the point of launch to the target. Based upon the waypoints, then, the route and the approach angle to the target can be selected for the Harpoon Block II missiles. The computer checks each leg of the route to assure that the Harpoon Block II missile has the energy and control to execute all maneuvers and maintain the flight path and then creates an engagement plan consisting of the parameters needed by the store to execute the planned mission. Thus, with the GPS precision, there is no need for the terminal seeker and the accompanying pre-launch search size and range data required by Harpoon Block I missiles, as the missile will hit a precise latitude, longitude and altitude in the earth reference system.

Also, the GNU 32 of the Harpoon Block II missile can determine the pre-launch inertial position and velocity of the missile at the time of launch and, as such, will not require aircraft attitude, altitude or true air speed data loaded before launch. Therefore, to launch a Harpoon Block II missile from an aircraft 10 requires application of aircraft power, loading of the preplanned engagement plan and the release (i.e., initiating the store internal battery and deployment) at a predetermined launch point.

As explained in the background section, Harpoon Block II missiles (i.e., stores of a first predetermined type) generally include the same umbilical interface connection to the aircraft pylon, and use the same electrical power and control specification and connector pin assignments, as Harpoon Block I missiles (i.e., stores of a second predetermined type). In contrast to Harpoon Block I missiles, however, Harpoon Block II missiles have a more sophisticated flight control system that allows precision GPS-aided navigation to targets that cannot be assigned to Harpoon Block I missiles. The GPS-aided navigation system allows the Harpoon Block II missile to fly a more complex mission engagement path using parameters that must be preplanned and stored in the weapon's volatile memory before launch. Due to the increased number of parameters that can be loaded into Harpoon Block II missiles, conventional bus test support equipment designed for Harpoon Block I missiles cannot retain the increased amount of data, and cannot fault isolate errors in the launch equipment and missile data.

Embodiments of the preset invention therefore provide a bus monitor assembly 26 capable of monitoring the communication bus 25, such as the MK-82 Digital Data bus, that allows bi-directional communication between an aircraft 10 and the store 12, or more particularly between the weapon control subsystem 18 (or control interface 19) and a processor (e.g., GNU 32) onboard the store. As explained below, the aircraft is typically adapted to control the operation of Harpoon Block I missiles (i.e., stores of a second predetermined type), whereas the store communicating with the aircraft may, instead, comprise a Harpoon Block II missile (i.e., store of a first predetermined type). More particularly, the bus monitor assembly is capable of capturing traffic on the communication bus (i.e., bus or data communications between the aircraft and the store), and determining if the bus communications are correct for one or more different types of stores. In addition, the bus monitor assembly can be capable of detecting events that may be reflected in one or more external outputs of the weapon control subsystem (or control interface).

Advantageously, the bus monitor assembly 26 is capable of supporting the expanded data of Harpoon Block II missiles, while also supporting the data communications to/from Harpoon Block I missiles. Also, in addition to capturing traffic on the communication bus and determining if the communications are correct, the bus monitor assembly is capable of providing menu-driven displays. Such displays, then, can facilitate a user directing the bus monitor assembly to display the captured communications, such as in word blocks by name, scaled values, and/or correctness and/or reasonableness.

Figure 4:
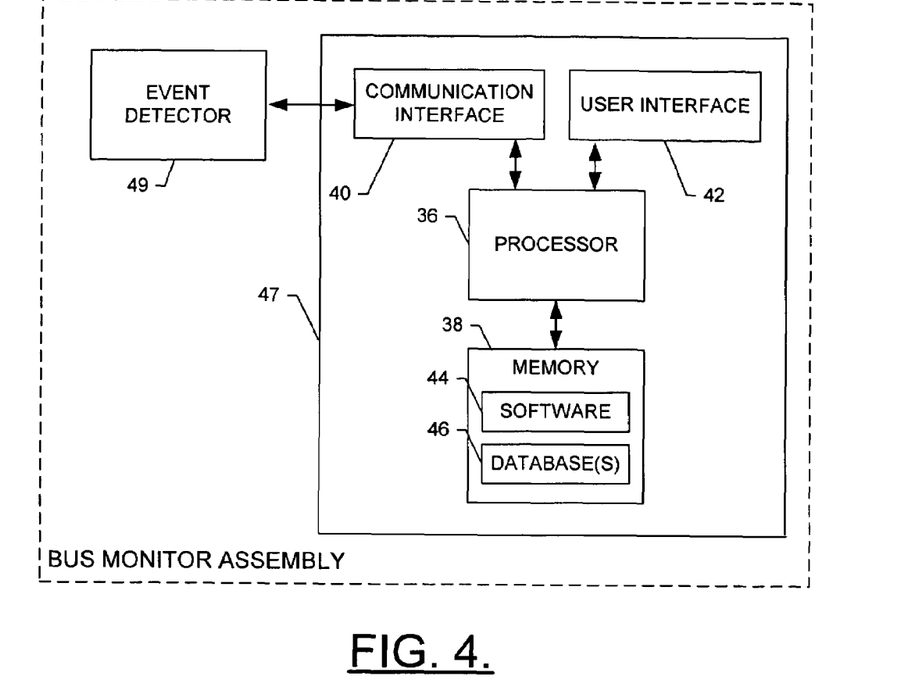
FIG. 4 is a schematic block diagram of a bus monitor assembly in accordance with embodiments of the present invention.

Referring now to FIG. 4, a block diagram of a bus monitor assembly 26 is shown in accordance with one embodiment of the present invention. As shown, the bus monitor assembly can generally include a processor 36 connected to a memory 38. In addition, the processor can be connected to at least one communication interface 40 or other means for transmitting and/or receiving data, content or the like. In this regard, one or more of the communication interface(s) can be coupled between the communication bus 25 and the processor for connecting the communication bus and the processor. The processor can also, but need not, be connected to a user interface 42 that can include a display and/or a user input interface. The user input interface, in turn, can comprise any of a number of devices allowing the entity to receive data from a user, such as a keypad, a touch display (not shown) or other input device.

The memory 38 can comprise volatile and/or non-volatile memory, and typically stores content, data or the like. In this regard, the memory typically stores one or more software applications 44, instructions or the like for the processor to perform steps associated with operation of the bus monitor assembly 26 in accordance with embodiments of the present invention. For example, the memory can store a data monitoring application capable of functioning in accordance with embodiments of the present invention to capture data passing to and/or from one or more stores 12 through the interconnect box 20. The monitoring application can also be capable of driving the user interface 42 to present the captured data to a user, such as by presenting the captured data in word blocks by name, scaled values, validity and/or reasonableness. In this regard, the monitoring application can be capable of determining if the data passing to and/or from the store is valid for any one or more of a number of different types of stores, including Harpoon Block I and Block II missiles. Also, the memory can store one or more databases 46 such as to store the data passing to and/or from the store(s). As will be appreciated, in accordance with various embodiments of the present invention, the processor 36, memory, communication interface(s) 40, user interface 42, software and databases can be embodied in a computer system 47 such as a personal computer, laptop computer or the like.

In addition, the bus monitor assembly 26 can include an event detector 49 connected to one or more of the communication interface(s) 40, such as to indirectly connect the event detector to the processor 36. The event detector itself can include a processor, memory, one or more communication interfaces, and/or a user interface (not shown). Although the event detector can comprise any of a number of different devices capable of operating in accordance with embodiments of the present invention, in one embodiment the event detector comprises an oscilloscope. In this regard, the event detector can be connected to the weapon control subsystem 18 (or control interface 19) for capturing or otherwise receiving one or more external output(s) from the weapon control subsystem (or control interface). Likewise, the event detector can be connected to one or more of the communication interface(s) for receiving one or more external output(s) of the computer system 47, the external outputs being driven by the processor 36 of the computer system, and thus the bus monitor assembly. For example, one of the communication interface(s) can comprise a conventional parallel port, such as a 16-bit parallel port, including a plurality of pins. In such instances, the event detector can be connected to one or more of the pins of the parallel port. Similarly, the event detector can be connected to one or more external pins of the weapon control subsystem (or control interface).

Figure 5:
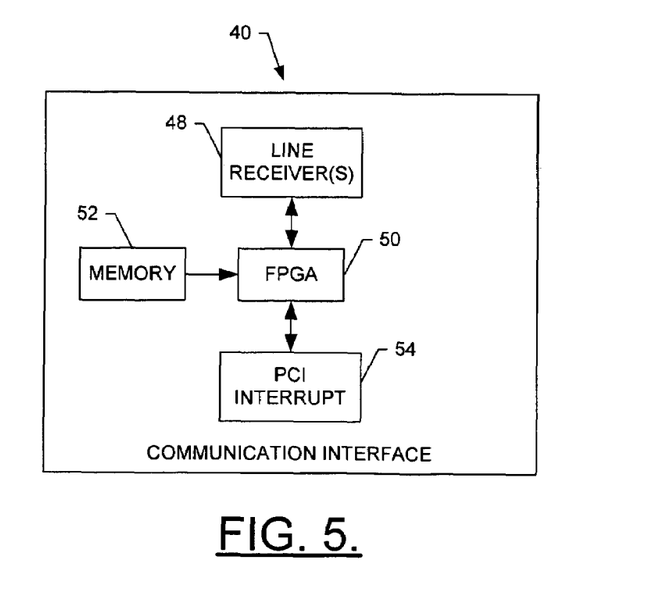
FIG. 5 is a schematic block diagram of a communication interface of a bus monitor assembly, in accordance with one embodiment of the present invention.

Referring now to FIG. 5, a block diagram of a communication interface 40 of the bus monitor assembly 26, such as a communication interface coupled between the communication bus 25 and the processor 36, is shown in accordance with one embodiment of the present invention. As shown, the communication interface can include one or more line receivers 48 capable of capturing or otherwise receiving data communications on the communication bus 25. For example, the line receiver(s) can be capable of receiving traffic on lines J1-J6 of a MK-82 Digital-Data bus, as such is well known to those skilled in the art. The communication interface can also include a processor. The processor, in turn, can comprise a field-programmable gate array (FPGA) 50, for example. In such instances, the communications interface can also include a memory 52, such as an electrically erasable programmable read-only memory (EEPROM). The memory, then, can store firmware code, instructions or the like for the FPGA to perform steps associated with operation of the bus monitor assembly 26 in accordance with embodiments of the present invention.

Figure 6:
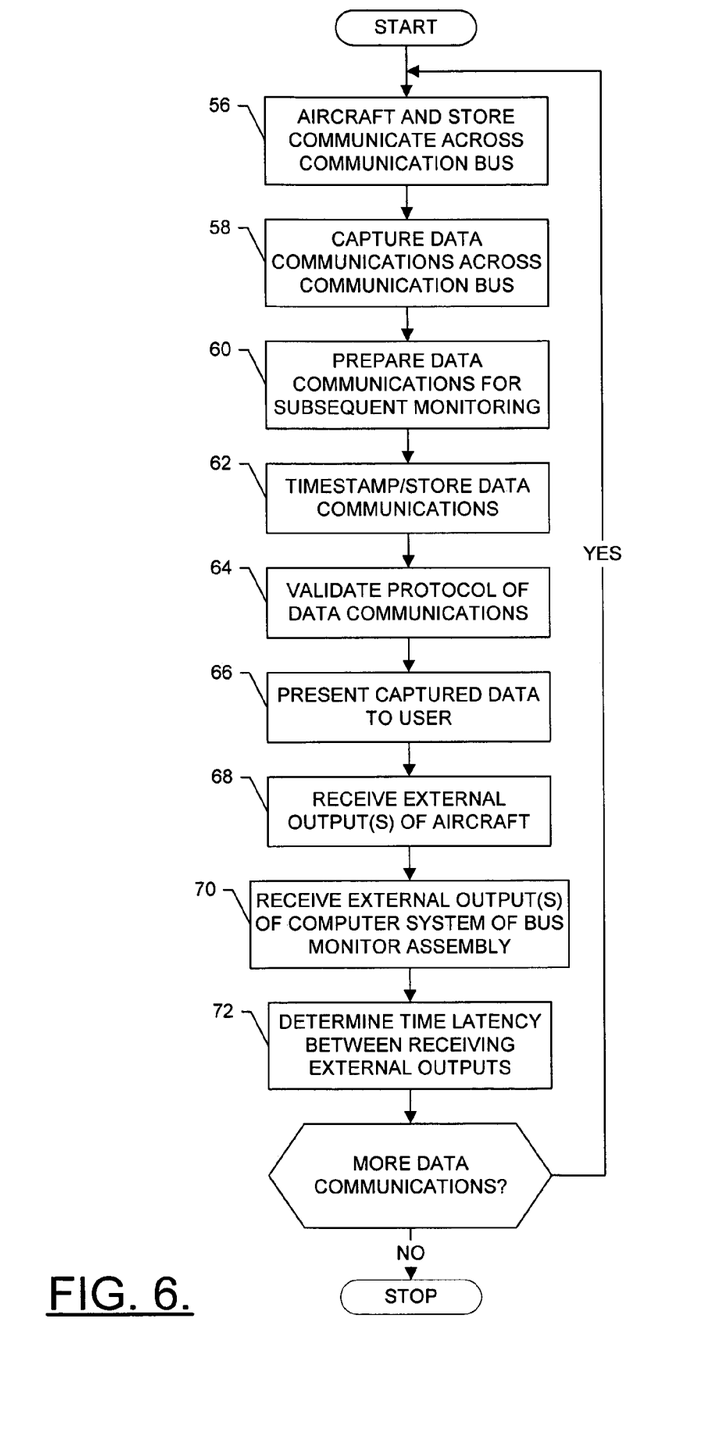
FIG. 6 is a flowchart illustrating various steps in a method of monitoring at least one data bus of an aircraft according to one embodiment of the present invention.

Reference is now made to FIG. 6, which illustrates various steps in a method of monitoring at least one data bus of an aircraft 10 according to one embodiment of the present invention. As shown in block 56, the method includes the aircraft and a store 12 communicating across a communication bus 25 (e.g., MK-82 Digital Data bus). And as the aircraft and store communicate, a bus monitor assembly 26 captures or otherwise receives the data communications transferred between the aircraft and the store across the data communications bus, the data communications being captured by the computer system 47, as shown in block 58. The communication interface 40, or more particularly the FPGA 50 of the communication interface, then prepares the data communications for subsequent monitoring by the bus monitor assembly 26 and, if so desired, performs one or more built-in-tests (BITs) with respect to such communications, as shown in block 60. More particularly, for example, the FPGA can prepare MK-82 Digital Data Bus missile data by separating the parity bit from the remaining 16 bits of data. In this regard, the processor 36 of the bus monitor assembly can instruct the FPGA to receive and prepare data communications via an interrupt module, such as a peripheral component interconnect (PCI) interrupt module 54. Thereafter, the FPGA can provide the prepared data communications to the processor.

Upon receipt of the data communications, the bus monitor assembly 26, or more particularly the processor 36 operating the data monitoring application 44, can timestamp the captured data communications for storage in the memory 38 of the bus monitor assembly, such as in the database(s) 46 in the memory, as shown in block 62. In addition, the data monitoring application can validate the protocol of the data communications, as shown in block 64. As will be appreciated, the data monitoring application 44 can validate the message sequence of data communications between the aircraft 10 and the store 12, data word parity and/or message checksums. The data monitoring application 44 can validate the message sequence in any of a number of different manners. For example, the data monitoring application can validate the message sequence by monitoring a response to each data word transferred between the aircraft 10 and the store 12 to determine if the receiving device properly interpreted the data word. Additionally or alternatively, the data monitoring application can validate the message sequence based upon a known message sequence between the aircraft and the store during operation.

The data monitoring application 44 can likewise validate data word parity and message checksums in any of a number of different manners. For example, as is well known to those skilled in the art, the aircraft 10 and/or store 12 can be configured to perform a data transfer test whereby the aircraft and/or store check all transferred data for parity and checksum errors. In such instances, when the store/aircraft determines that data communications received from the aircraft/store are valid, the store/aircraft sets a "good data" word in the output register that gets clocked back to the aircraft/store across the communication bus 25. This "good data" word allows the aircraft/store to ascertain that the transfer was successful. Likewise, by capturing the "good data" word from the communication bus, the data monitoring application can validate the data word parity and message checksums.

Additionally or alternatively, for example, the data monitoring application 44 can validate data word parity and message checksums in a manner similar to that of the aircraft 10 and/or store 12. As known to those skilled in the art, the Harpoon MK-82 data transfer consists of 16-bit data words that each include a 17th bit added to yield odd "logic ones" parity for each set of 17 bits. Also, the total number of bits of data transferred that have the logic "one" state can be numerically added to produce a "checksum" word, which is transferred with the bus communications. These parity bits and the checksum word allow the store/aircraft, and can similarly allow the data monitoring application, to verify the accuracy of the transfer.

Thus, the data monitoring application 44 can also calculate the parity of each set of 17 bits and numerically total the logic "ones" received. The data monitoring application can then compare the calculated values to the parity and checksum values transferred across the communication bus 25. If the transferred values match the calculated values, the data monitoring application validates the parity and checksum values. Otherwise, if one or both of the transferred values do not match the calculated values, the data monitoring application invalidates the transferred value(s) that do not match the calculated value(s).

Figure 7:
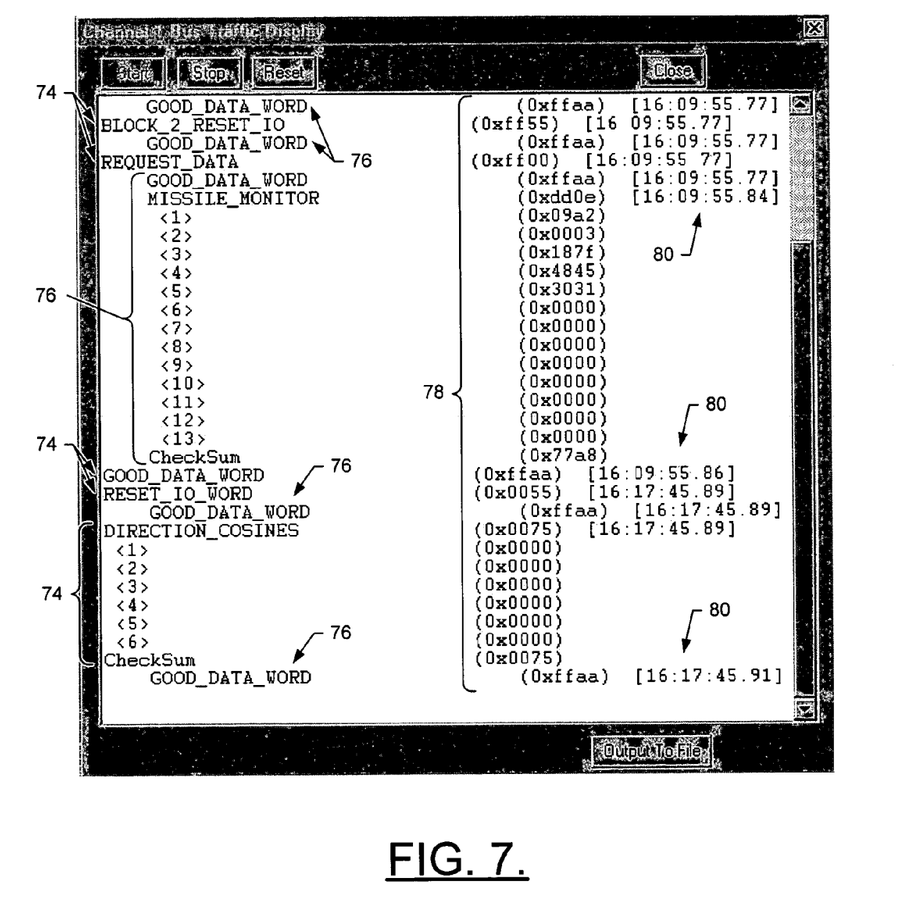
FIGS. 7 and 8 illustrate exemplary displays presented by the user interface of a bus monitor assembly, in accordance with one embodiment of the present invention.
Figure 8:
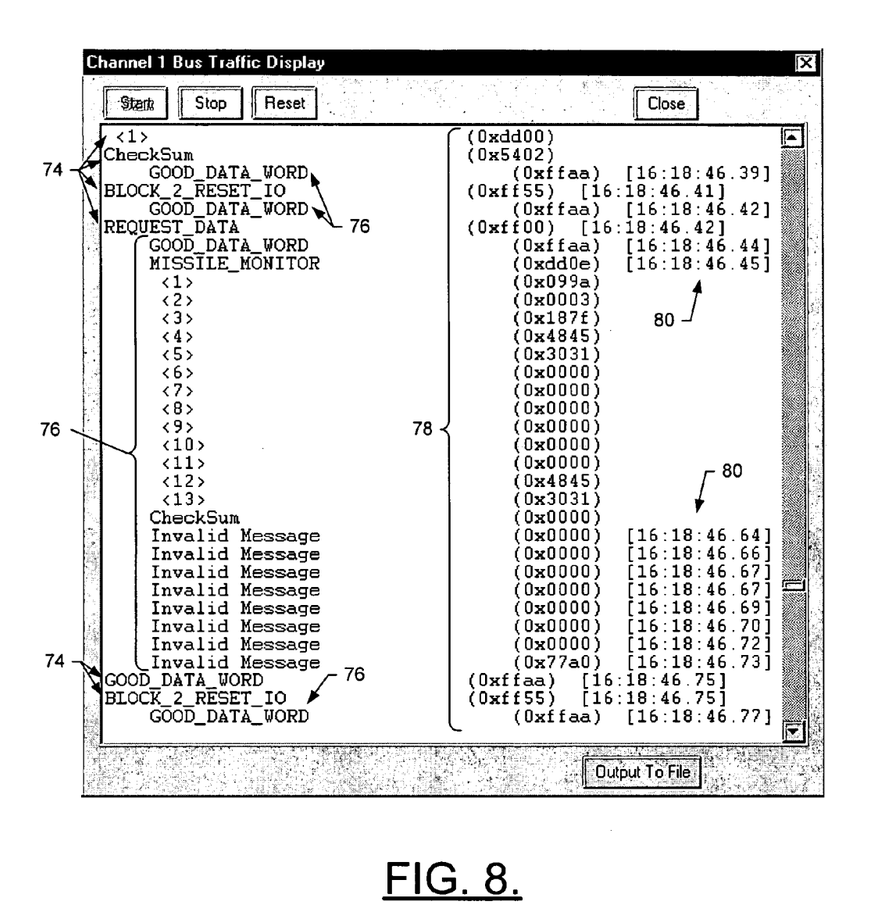

After validating the data protocol, the data monitoring application 44 can drive the user interface 42 of the bus monitor assembly 26 to present the captured data to a user, such as by presenting the captured data in word blocks by name, scaled values, validity and/or reasonableness, as shown in block 66. To more particularly illustrate exemplary displays presented by the user interface of the bus monitor assembly, reference is made to FIGS. 7 and 8. As shown, the user interface can present data communications from the aircraft 10 to the store 12 (indicated by reference 74) and data communications from the store to the aircraft (indicated by reference 76), data communications from the store to the aircraft being indented in the exemplary displays. As also shown, valid data word blocks can be identified by name (e.g., Block_2_reset_IO, Good_Data_Word, etc.), and can also include a word number for those word blocks including more than one word. In contrast to valid data word blocks, the invalid data word blocks can be identified by an identifier such as "invalid message," as shown in FIG. 8. In addition, the valid and invalid data word blocks can include the transferred data word blocks 78 and/or a timestamp indicating when the bus monitor assembly captured the respective data word blocks 80.

Further, before, after or as the computer system 47 of the bus monitor assembly 26 captures data communications between the aircraft 10 and the store 12 (see block 58), the event detector 49 of the bus monitor assembly captures or otherwise receives one or more external outputs of the aircraft, or more particularly of the weapon control subsystem 18 (or control interface 19) of the aircraft, as shown in block 68. As will be appreciated, when the weapon control subsystem (or control interface) of the aircraft processes various data communications for transfer to the store, such as time critical data communications (e.g., attitude data communications), the weapon control subsystem (or control interface) can be configured to provide an external output of such data processing. And when the time critical data communications are transferred across the communication bus 25, the computer system 47 of the bus monitor assembly can be configured to likewise provide an external output of such data passing to the store, which the event detector can also capture or otherwise receive, as shown in block 70.

Based upon the external output(s) captured from the weapon control subsystem 18 (or control interface 19) and the computer system of the bus monitor assembly, then, the event detector can determine, or facilitate a user determining, a time latency between receiving the external outputs from the aircraft 10 and the computer system 47 of the bus monitor assembly 26, as shown in block 72. More particularly, the event detector can determine, or facilitate a user determining, a time latency between processing of a time critical data communication and transfer of the respective time critical data communication across the communication bus. This time latency can then be presented or otherwise illustrated (e.g., by comparison of receipt of the external output(s) from the aircraft and the computer system) by the user interface of the event detector. Additionally or alternatively, data representative of receipt of the external output(s) (e.g., timestamps) and/or the determined time latency can be captured or otherwise stored by another device, such as the computer system of the bus monitor assembly, for subsequent presentation, analysis or the like.

As will be appreciated, the method of monitoring the communication bus 25 of the aircraft 10 can continue while the aircraft and store 12 communicate across the communication bus (see block 56), as shown in block 74. In this regard, for data communications transferred across the communication bus, the bus monitor assembly 26, or more particularly the computer system 47 of the bus monitor assembly, can repeatedly capture the data communications (see block 58), and prepare the data communications for subsequent monitoring (see block 60). Also, the computer system can repeatedly timestamp and store the data communications (see block 62), validate the protocol of the data communications (see block 64), and present the captured data to the user (see block 66). In addition, the event detector 49 of the bus monitor assembly can repeatedly receive external output(s) of the aircraft and the computer system (see blocks 68 and 70), and determine a time latency based upon the external outputs (see block 72).

According to one aspect of the present invention, all or a portion of the system of the present invention, such as all or portions of the bus monitor assembly 26, generally operates under control of a computer program product (e.g., data monitoring application 44). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 6 is a flowchart of methods, systems and program products according to embodiments of the present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of block(s) or step(s) in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring at least one data bus of an aircraft, the system comprising:
   an aircraft configured to control operation of stores of a second predetermined type but also configured to carry a store of a first predetermined type, and wherein the aircraft is configured to communicate with at least one of stores of the first predetermined type or stores of the second predetermined type across a communication bus; and
   a bus monitor assembly configured to capture data communications transferred across the communication bus between the aircraft and a store of one of the first predetermined type or the second predetermined type, wherein the bus monitor assembly is also configured to prepare the data communications, and monitor the communication bus across which the data communications are transferred, the communication bus being monitored based upon the prepared data communications.

2. A system according to claim 1, wherein the bus monitor assembly is configured to validate a protocol of the prepared data communications to thereby monitor the communication bus.

3. A system according to claim 2, wherein the bus monitor assembly is configured to validate at least one of a message sequence, a data word parity or a message checksum to thereby validate the protocol of the prepared data communications comprises.

4. A system according to claim 1, wherein the bus monitor assembly is configured to store the prepared data communications, and present the stored data communications to a user, to thereby monitor the communication bus.

5. A system according to claim 1, wherein the bus monitor assembly comprises:
   a computer system configured to capture the data communications, prepare the data communications, and monitor the communication bus across which the data communications are transferred, wherein the computer system is also configured to provide at least one external output in response to capture of the data communications; and
   an event detector configured to capture at least one external output of the aircraft, and configured to capture the at least one external output of the computer system, wherein the event detector is configured to one of determine, or facilitate determination of, a time latency between capture of the at least one external output of the aircraft and the at least one external output of the computer system.

6. A system according to claim 1, wherein the aircraft is configured to control the operation of Harpoon Block I missiles, and wherein the aircraft is configured to carry a Harpoon Block II missile.

7. A system according to claim 1, wherein the aircraft is configured to communicate with the store across a communication bus a MK-82 Digital Data Bus, and wherein the bus monitor assembly is configured to capture data communications transferred across the MK-82 Digital Data Bus between the aircraft and the store.

8. A bus monitor assembly configured to monitor at least one data bus of an aircraft configured to control operation of stores of a second predetermined type, the bus monitor assembly comprising:

a computer system configured to capture data communications transferred across a communication bus between the aircraft and a store of a first predetermined type, the data communications being captured from the communication bus, wherein the computer system is configured to prepare the data communications, wherein the computer system comprises a processor configured to operate a data monitoring application, and wherein the data monitoring application is configured to monitor the communication bus across which the data communications are transferred, the data monitoring application being configured to monitor the communication bus based upon the prepared data communications.

9. A bus monitor assembly according to claim 8, wherein the data monitoring application is configured to validate a protocol of the prepared data communications to thereby monitor the communication bus.

10. A bus monitor assembly according to claim 9, wherein the data monitoring application is configured to validate at least one of a message sequence, a data word parity or a message checksum to thereby validate the protocol of the prepared data communications.

11. A bus monitor assembly according to claim 8, wherein the computer system further comprises a memory and a user interface, and wherein the data monitoring application is configured to store the prepared data communications in the memory, and drive the user interface to present the stored data communications to a user, to thereby monitor the communication bus.

12. A bus monitor assembly according to claim 8, wherein the computer system is also configured to provide at least one external output in response to capture of the data communications, and wherein the bus monitor assembly further comprises:

an event detector configured to capture at least one external output of the aircraft, and configured to capture the at least one external output of the computer system, wherein the event detector is configured to one of determine, or facilitate determination of, a time latency between capture of the at least one external output of the aircraft and the at least one external output of the computer system.

13. A bus monitor assembly according to claim 8, wherein the stores of a second predetermined type comprise Harpoon Block I missiles, and wherein the computer system is configured to capture data communications transferred across a communication bus between the aircraft and a Harpoon Block II missile.

14. A bus monitor assembly according to claim 8, wherein the computer system is configured to capture data communications transferred across a MK-82 Digital Data Bus between the aircraft and the store of a first predetermined type.

15. A method of monitoring at least one data bus of an aircraft configured to control operation of stores of a second predetermined type, the method comprising:

capturing data communications transferred across a communication bus between the aircraft and a store of a first predetermined type, the data communications being captured from the communication bus;

preparing the data communications; and monitoring the communication bus across which the data communications are transferred, the communication bus being monitored based upon the prepared data communications.

16. A method according to claim 15, wherein monitoring the communication bus comprises validating a protocol of the prepared data communications.

17. A method according to claim 16, wherein validating a protocol of the prepared data communications comprises validating at least one of a message sequence, a data word parity or a message checksum.

18. A method according to claim 15, wherein monitoring the communication bus comprises storing the prepared data communications, and presenting the stored data communications to a user.

19. A method according to claim 15, wherein capturing data communications comprises capturing data communications at a bus monitor assembly, and wherein the method comprises:

capturing at least one external output of the aircraft;

capturing at least one external output of the bus monitor assembly, the at least one external output being provided in response to the bus monitor assembly capturing data communications; and determining a time latency between capturing the at least one external output of the aircraft and the at least one external output of the bus monitor assembly.

20. A method according to claim 15, wherein the stores of a second predetermined type comprise Harpoon Block I missiles, and wherein capturing data communications comprises capturing data communications transferred across a communication bus between the aircraft and a Harpoon Block II missile.

21. A method according to claim 15, wherein capturing data communications comprises capturing data communications transferred across a MK-82 Digital Data Bus between the aircraft and a store of a first predetermined type.

* * * * *